United States Patent Office 3,103,325
Patented Sept. 10, 1963

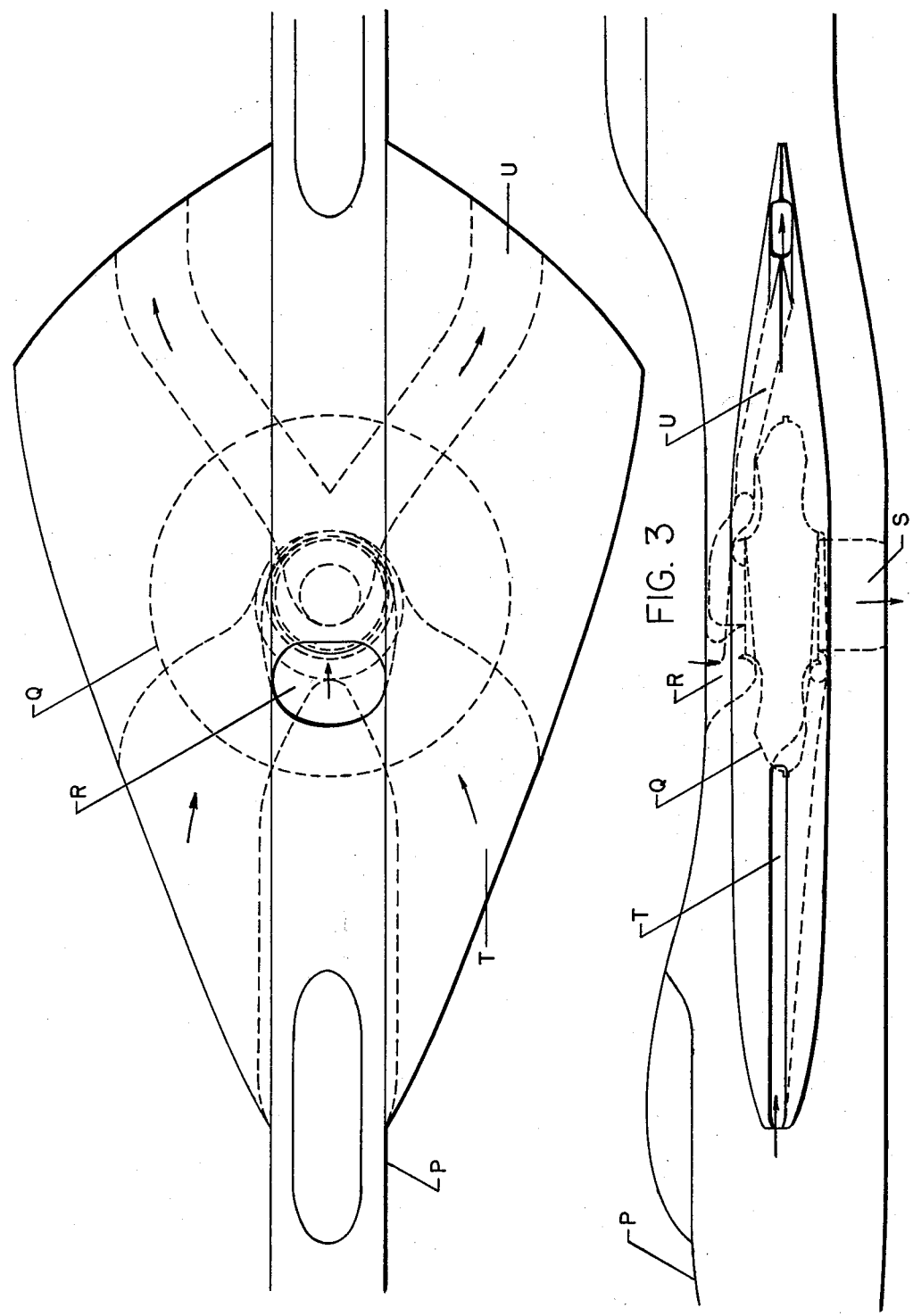

3,103,325
RADIAL JET ENGINE
Rudolph Leslie Leutzinger, 1521 N. Holder Road,
Independence, Mo.
Filed June 13, 1960, Ser. No. 35,778
2 Claims. (Cl. 244—12)

This present invention relates to a gas turbine and its installation in an airframe and in more particular, a radial gas turbine having compressor and turbine means mounted integrally on opposite sides of a thin rotor or radial ring, each side passing a radial flow but of reversed direction.

The present invention has for one of its objects to provide an improved arrangement of turbojet components to produce a gas stream by addition of thermal energy to compressed air in a combustion chamber in a more efficient, economical and simplified manner.

A further object is to provide a simplified, compact means for converting the gas stream generated into either a vertical or a horizontal propulsive thrust, or into each for vertical take off and landing operation or for horizontal flight or for any combination thereof.

A further object is to provide a single engine utilizing turbojet engine components in a compact construction and simplified arrangement capable of generating two dual jet streams within the single engine for reactive thrust propulsion.

Another object is to provide a simplified compact means with a minimum of complexity for affecting transition from vertical to horizontal flight operation and vice versa internally within the engine contour itself where by the apportionment of the gas generated may be arbitrarily divided and continuously varied from expansion in the vertical nozzle to full expansion in the horizontal nozzle.

Still another object is to provide a power plant envelope whose geometrical contour conforms to the airframe aerodynamic requirements for low drag and high aerodynamic efficiency and provides both the engine and a portion of the airframe structure such as to constitute a single engine airframe unit.

Another object is to provide a compact simplified arrangement of minimum complexity and weight for the transfer of power from the turbine means to the compressor means directly such as to constitute a direct drive.

Still another object is to provide a very high pressure gas generator from a single stage or with limited staging to obtain minimum weight and minimum specific fuel consumption.

Another objective is to provide a combustion chamber contour and flow path having inherently the potential for good mixing and high combustion efficiency.

The particular object of each component and an elaboration thereof and the specific means employed for the embodiment of the previously said objects can be understood from the drawings and the detailed description to follow. It is stated that the objects enumerated here are by no means all inclusive of the applications to which this engine may be put.

The engine of the invention operates on a modified Brayton cycle to produce high velocity jet streams by the addition of thermal energy to an air stream in a combustion chamber. It is designed to provide either alternately or simultaneously, vertical and/or horizontal propulsive thrust forces. These forces are obtained from expansion in nozzles which, with the engine, have been integrated into the airframe to form a single engine-airframe unit. A vertical nozzle is used to provide vertical landing and take off capability and also to supply a varying amount of lift, in conjunction with a wing, for combined and normal horizontal flight operations. Two in-wing horizontal thrust nozzles are also supplied by the engine. Transition from vertical to horizontal flight of the air vehicle is effected internally in the engine, by vertical displacements of the center body flow divider mounted in the radial discharge chamber.

*Description of Drawings*

FIGURE 1–a shows the cross section 1—1 with the center body L fixed in vertical take off position. FIGURE 1–b is the same cross sectional view but the center body flow divider has been translated to the design horizontal flight position which is the design cruise condition. Also flap J is actuated to the design cruise position in FIGURE 1–b.

FIGURE 3 is an installation drawing of the engine in the airframe shown in both plan and elevation with the connecting duct-work from the leading edge intake to lower centrifugal compressor inlet and from the radial discharge chamber through dual in-wing exhaust ducts. Also the vertical thrust nozzle and inlet are shown.

Figure 2:
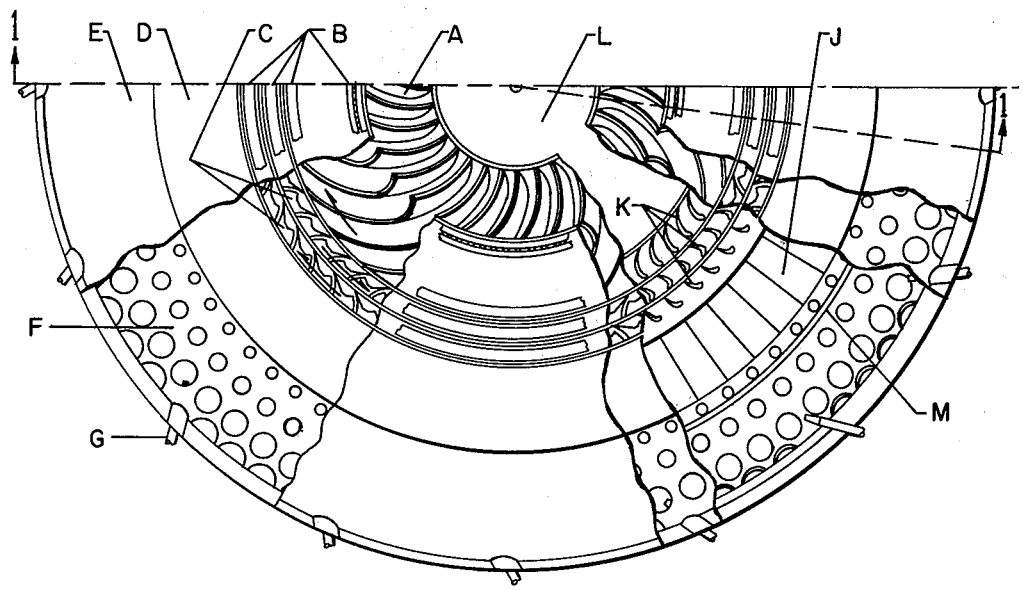
FIGURE 2 is a plan view of the engine with part of the compressor and combustion chamber cut-away to expose the component parts.

The following letters have been used to designate the components appearing in FIGURE 2:

A—double entry centrifugal compressor (upper and lower sections)
B—bearing ring races
C—supersonic diffusor blades
D—diffuser (radial)
E—combustion chamber
F—inner liner
G—fuel nozzles
H—nozzle (radial)
I—blade mounting ring and flow separator
J—flap
K—integral turbine blades
L—center body flow divider
M—flame holders
N—shroud ring
O—radial discharge chamber The following letters have been used to designate the subassemblies of FIGURE 3:

P—airframe
Q—supersonic integral bladed turbo jet engine
R—vertical inlet to upper compressor section
S—vertical thrust nozzle
T—ram inlet duct to lower compressor section
U—aft exhaust duct

*Detailed Description*

Figure 1B:
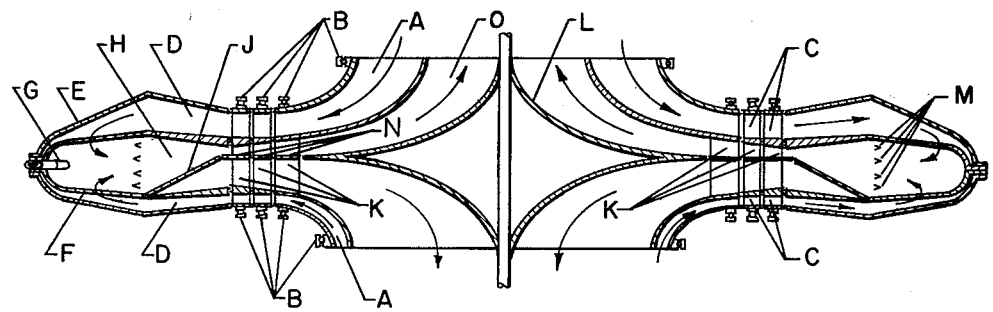
FIGURES 1–a and 1–b are cross sectional views of FIGURE 2 with the cross section taken radially along the cutting plane line 1—1, shown in FIGURE 2.
Figure 1A:
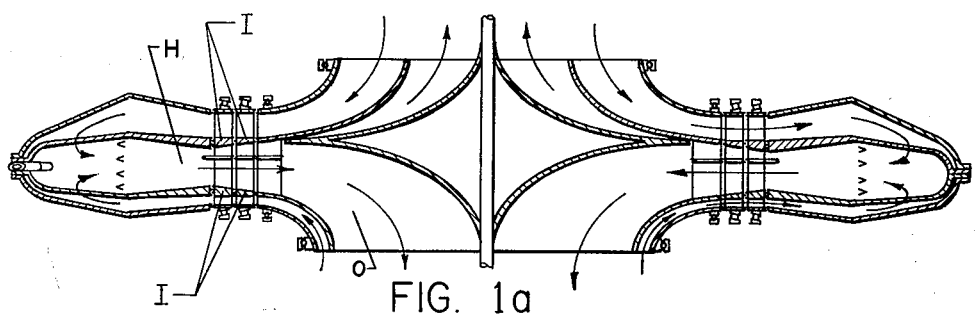

Inlet ducts R and T, FIGURE 3, supply air to the double entry centrifugal compressor A, FIGURES 1–b and 2, whose upper and lower sections rotate as a unit and are connected through the inner ring of turbine blades K, said ring of turbine blades driving both upper and lower sections of the centrifugal compressor in say a clockwise direction, said compressor sections consisting of forward facing vanes enclosed between two runners, each section discharging into a ring of counter rotating supersonic diffuser blades C, each ring of said blades being concentric and external to each section of the compressor, said upper and lower diffusor blades being connected end to end through a central turbine blade K such that the axis of a single three blade assembly is parallel to the engine center line around which the blade mounting rings I rotate. The supersonic diffusor blading discharges into either a second ring of blades rotating clockwise as shown or if only a single ring of upper and lower blades is used they discharge directly into a fixed subsonic diffusor D, said diffusor being concentric with respect to the engine center line and discharging into the combustion chamber E.

The flow path through the combustion chamber is pseudo-helical changing from outward to inward flow in the inner liner F and leaving the inner liner in the direction of G, that is, at a constant angle with a radial line, said combustion chamber being concentric to the shaft center line and located so as to combine upper and lower out flows from the subsonic diffusers into a single central inflow into which fuel is injected by fuel nozzle G, burned and fed into the concentric nozzle H containing the two position flap J.

Said nozzle H directs the central flow into the first turbine stage consisting of a concentric blade ring K each blade of which is integrally connected to an upper and lower diffusor blade, thereby making a direct drive between the turbine and compressor sections, which sections are separated by the blade mounting rings I, said rings containing sufficient labyrinths to separate the out flow in the compressor-diffusion section from the central inflow turbine passage. The turbine blading K discharges into the radial discharge chamber O formed by the inner runner of the centrifugal compressor and the stationary center body flow divider L. FIGURES 1–b and 1–a show the flow divider and flap J in the design cruise and take off positions, respectively. Other vertical positions of the flow divider provide for simultaneous discharge through both upper and lower passages of chamber O to supply the aft discharge duct U and vertical nozzle S, FIGURE 3, according to the transitional mass flow requirements. For this condition, intakes R and T also act simultaneously to supply the upper and lower inlets of the centrifugal compressor A.

I claim as new and original:

1. A double entry radial gas turbine supported in the wing plane of an airframe, said plane constituting the radial flow plane of the engine, said engine provided with dual intake passages both top and bottom from the wing leading edge and from intakes elsewhere in the airframe, a compressor, said compressor being of the double entry dual section type, upper and lower sections being connected and driven through a final turbine blading stage distributed concentrically around the periphery between the upper and lower sections of the centrifugal compressor and attached to the inner runners, said runners being concentric rings extending radially outboard from the compressor inlet means and sloping outboard toward each other and toward the central radial wing plane, there being two inner runners and two outer runners provided to contain the vanes in both the upper and lower sections of the compressor, said vanes between runners having a spiral type curvature for turning the flow in the forward rotational direction and discharging it forwardly and outboardly into the upper and lower sections of a concentric pair of inner and outer counter-rotating blade ring assemblies, each said assembly comprising a turbine section containing turbine blades, each blade set vertically between two vertically spaced interior horizontal mounting rings, and joined at each end through said mounting rings to two diffuser blades, upper and lower sections, mounted vertically between two vertically spaced exterior horizontal mounting rings, said exterior mounting rings being set in bearings, top and bottom, each blade having its longitudinal axis approximately vertical and approximately parallel to the engine center line about which it rotates, said interior mounting rings being parallel to each other and self equilibrating and separating the outflow diffuser sections, top and bottom, from the central inflow turbine section, each of said blade ring assemblies being free to rotate in said bearings with no external power drive required, constant speed regulation being obtained by blade pitch adjustments, variable pitch adjustment being a rotation of each individual blade about its own axis by its eccentric center of gravity being in the centrifugal force field of the rotating ring which field acts in planes normal to the blade axis and is proportional to the speed of rotation, a fixed section joined to the rotating rings through labyrinths which effect a separation of the outflow diffuser section from the inflow nozzle section, said fixed diffuser section being concentric and extending radially outward to join a radial inflow combustion chamber in which the two outward flows, upper and lower, are turned and combined into a single central inward flow along a pseudo-half-helical path, an inner liner, combustion means in said inner liner, said chamber extending radially from the diffuser and concentrically around the engine center line and containing the inner liner, said combustion means comprising equally spaced fuel nozzles and flame holder grid, said inner liner being concentric to the engine center line and extending radially inside the combustion chamber to which it is mounted circumferentially along one end, said liner having holes of radially outwardly graduated diameters for admitting the outer combustion chamber air and also directing the air so as to mix and combine the outflow from the upper and lower sections to form a single inflow stream for addition of fuel and burning, the flame being contained inside the inner liner by the flame holders, a nozzle, said nozzle being radial and concentric to the engine center line and extending radially between the upper and lower diffuser sections from the combustion chamber to the first turbine section, said nozzle directing the gases from the combustion chamber into the turbine section of the outer radial ring, said nozzle containing an interlapping leaf type flap attached concentrically to the nozzle, which when actuated to design cruise position effects a variation in the nozzle area such as to constitute a variable nozzle, said nozzle discharging through the turbine section into an axial discharge chamber, said chamber being formed by the inner runners of the centrifugal compressor into which the inner turbine blade ring discharges, said chamber housing a flow divider and providing two outlets, upper and lower, for discharge to the vertical and horizontal nozzles, said flow divider and inner runners acting as a variable area duct into which the inflow enters radially and is divided by the flow divider into two oppositely directed streams of differing area and mass flow corresponding to the vertical elevation of the flow divider from the lower forward thrust position to the upper vertical thrust location, which streams are then ejected normal to the radial inflow plane through the chamber's vertical outlets, said flow divider being a center body extending axially symmetrically from the engine center line into the radial discharge chamber and forming the means for directing the flow downward through the vertical lift nozzle or upward into a plenum chamber, through the wing ducting and into horizontal thrust and control nozzles, said flow divider being suspended from a vertical tube along which it may be translated and from which its contour may be varied, said tube being supported from the airframe.

2. A gas turbine as defined in claim 1 wherein the upper and lower halves of the compressor are uncoupled and wherein the downstream turbine vanes attached on the periphery of the compressor are dual section vanes, allowing said upper and lower halves to rotate at different speeds.

References Cited in the file of this patent

UNITED STATES PATENTS

| | | |
|---|---|---|
| 2,391,779 | Griffith | Dec. 25, 1945 |
| 2,694,291 | Rosengart | Nov. 16, 1954 |
| 2,924,937 | Leibach | Feb. 16, 1960 |

FOREIGN PATENTS

| | | |
|---|---|---|
| 656,337 | Great Britain | Aug. 22, 1951 |
| 699,865 | Great Britain | Nov. 18, 1953 |